UNITED STATES PATENT OFFICE.

WILHELM HAAGE, OF WALSUM-ON-THE-RHINE, GERMANY, ASSIGNOR TO THE FIRM OF GEWERKSCHAFT PIONIER, OF WALSUM-ON-THE-RHINE, GERMANY.

PROCESS OF MANUFACTURING BRIQUETS FROM ORE OR BLAST-FURNACE DUST.

1,059,150.      Specification of Letters Patent.      Patented Apr. 15, 1913.

No Drawing.      Application filed November 5, 1912. Serial No. 729,669.

*To all whom it may concern:*

Be it known that I, WILHELM HAAGE, a citizen of the German Empire, residing at Walsum-on-the-Rhine, Germany, have invented certain new and useful Improvements in Processes of Manufacturing Briquets from Ore or Blast-Furnace Dust, of which the following is a specification.

It is a well known phenomenon that briquets, produced with the assistance of liquid organic binding means soluble in water and consequently containing a fairly large quantity of water, such as for instance the lye of cellulose sulfite, molasses, starch, etc., from fine ores, blast furnace fumes, etc., cannot be transported at once and used, but require a long drying by artificial or natural means in order to become suitable for transport and for use. It is also well known that briquets suitable for immediate use can be obtained with such binding means, by reducing the proportion of water in the binding substance to a minimum before addition to the material to be briqueted, that is to say, by evaporating the binding substance until dry, by adding it in a ground cold state to the material to be briqueted and by again making it cohesive by subsequent addition of steam, or by heating. This process is however complicated and requires a very high expenditure for evaporating and grinding the binding substance.

It has been found that certain kinds of finely-divided matter such as fine ores and flue dust or fumes, owing to their previous treatment or manufacture, can be manufactured directly into hard stony masses suitable for transport and use, with a binding substance containing any desired proportion of water.

The flue dust or fumes from blast furnaces, copper furnaces, zinc and tin furnaces, etc., are collected from the flues in case of dry purification at a temperature considerably above 100° C. In the same way, burned fine material from sulfur furnaces and roasting furnaces, etc., escape from such furnaces at a higher temperature than 100° C. If the binding substance containing water is added in a cold or preferably heated state to these hot materials, the excess of heat contained in the material to be briqueted, evaporates the water contained in the lyes. This evaporation can be regulated by the addition of more or less water to the binding substance, or by the addition of cold briquet material, in such manner as to produce a briqueting material containing just so much water as is required for rendering the binding material adhesive.

The utility of the process of treating the ore powder with the binding substance in heated state depends on the employment of water-soluble organic binding substances, because only in this case does the evaporation of water have the effect of making the briquets hard, whereas in the case of inorganic binding substances a fairly large proportion of water is required until the inorganic binding medium sets.

What I claim is:—

1. The process of manufacturing briquets from finely-divided matter, which consists in adding an aqueous solution of organic binding materials to the hot finely-divided matter while the finely-divided matter contains sufficient heat to evaporate a large proportion of the water of the binding solution, and then pressing the mass into briquets.

2. The process of manufacturing briquets from finely-divided matter, which consists in adding a solution of binding materials to hot finely-divided matter, thereby evaporating off the solvent of the binding materials by the heat of the finely-divided matter, and then pressing the mass into briquets.

3. The process of manufacturing briquets from heated finely-divided matter and a liquid binding agent, which consists in adjusting the heat values in the heated matter and binding agent to each other by the addition of cooler finely-divided matter so that the surplus heat in the resulting mixed finely-divided matter will evaporate enough of the liquid in the binding agent to produce an adhesive mass, then mixing said resulting finely-divided matter and binding agent, thereby producing the adhesive mass, and then briqueting the adhesive mass.

In testimony whereof I affix my signature in presence of two witnesses.

WILHELM HAAGE.

Witnesses:
    WOLDEMAR HAUPT,
    HENRY HASPER.